Patented Oct. 15, 1940

UNITED STATES PATENT OFFICE 2,217,660

SECONDARY XENOXY-ALKYL AMINES

Francis N. Alquist and Harold R. Slagh, Midland, Mich., assignors to The Dow Chemical Company, Midland, Mich., a corporation of Michigan No Drawing. Application July 27, 1938, Serial No. 221,605

6 Claims. (Cl. 260—571)

This invention concerns certain secondary amines having the formula

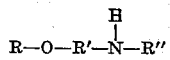

wherein R represents a xenyl radical, R' represents a lower alkylene group, and R" represents an organic residue, and the hydrochlorides thereof.

Our new secondary amines can be prepared by heating a mixture of a xenoxy-alkyl halide and a primary amine to a reaction temperature and thereafter separating out the desired secondary amine compound. We generally employ an appreciable excess of the primary amine in order that the major product of reaction may be the secondary amine compound. The reaction is carried out in the liquid phase under atmospheric pressure, or in a high pressure reactor under autogenous pressure, stirring being maintained throughout the process until the condensation is complete. The preferred temperature is dependent upon the particular reactants employed and is usually between about 125° C. and the decomposition temperature of the reaction mixture, although somewhat lower temperatures will sometimes accomplish the condensation. On completion of the heating step, the reaction mixture is washed with aqueous alkali or otherwise neutralized to liberate the free amine compounds. While the crude product so obtained has been found of value as an acid inhibitor, such mixture may be fractionally distilled under reduced pressure to obtain the desired secondary amines in substantially pure form. These compounds are for the most part high boiling oils difficultly soluble in water, somewhat soluble in most common organic solvents, and having a characteristic amine odor. The resinous tars obtained as distillation residues following the recovery of the secondary amines consists of a mixture of tertiary amine products, which decompose upon attempted distillation.

The hydrochlorides of the secondary amine compounds obtained as described above may be readily prepared by dissolving the secondary amine in a suitable organic solvent, e. g. benzene, petroleum ether, and the like, and thereafter bubbling dry hydrogen chloride through the solution to precipitate the desired amine salts. These hydrochlorides are generally solid crystalline compounds readily separable from such solvent suspension by filtration.

If desired, the condensation may be carried out in the presence of an inert organic solvent such as xylene, toluene, and the like. Also, a small amount of copper or potassium iodide catalyst may be included in the reaction mixture to accelerate the speed of reaction although this is not required. Similarly, inorganic alkalies, such as sodium carbonate, calcium oxide, etc., may be employed to expedite the condensation.

The expressions "xenyl," "xenoxy," and "xenol," as herein employed, refer to diphenyl and phenyl-phenoxy radicals and to the phenyl-phenols, respectively, and include such radicals and compounds wherein the benzene nuclei may be substituted by alkyl or halogen. The term "primary amine" refers to any mono-alkyl, cyclo-alkyl, aryl, aralkyl, hydroxy-alkyl, hydroxy-aryl amine, and the like, as well as to amine compounds of the type of naphthyl amine, benzidine, furfuryl amine, etc. The expression does not include such compounds as the carboxylic acid amides, amino acids, etc.

The xenoxy-alkyl halides employed as reactants in the preparation of our new secondary amines and their hydrohalides may be prepared by the reaction of an alkylene dihalide with an alkali metal xenolate, e. g. sodium-ortho-phenyl-phenolate. The xenoxy-alkyl halides are all high-boiling compounds and vary in characteristic from viscous oils to high-melting solids.

The following examples describe in detail several adaptations of our invention, but are not to be construed as limiting the same.

Example 1

A mixture of 116 grams (0.5 mol) of beta-2-xenoxy-ethyl chloride (melting point 55.2° C., boiling point 174°-176° C. at 10 millimeters pressure) and 100 grams (1.15 mols) of normal-amyl amine was refluxed for 28 hours at temperatures increasing from 105 to 140° C. The reacted mixture was then cooled and 220 milliliters of 10 per cent aqueous sodium hydroxide solution mixed therewith to liberate a mixture of free amine compounds as a water-immiscible oil. This oil was taken up in benzene and fractionally distilled, whereby there was obtained 111 grams of (beta-2-xenoxy-ethyl)-(normal-amyl)-amine as an amber oil having a characteristic amine odor, a specific gravity of 1.011 at 25°/25° C., and boiling at approximately 200° C. at 0.4 inch pressure. This compound has the following formula

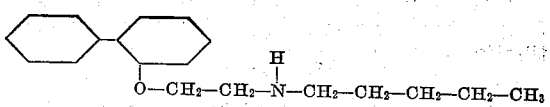

The residue from the above fractionation consisted of 19 grams of a viscous, brown oil somewhat soluble in benzene, and boiling with decomposition at temperatures above 25° C. at 0.4 inch pressure. This mixture was high in tertiary amine compounds.

A portion of the above secondary amine compound was dissolved in petroleum ether and reacted with an excess of dry hydrogen chloride, whereby there was obtained (beta-2-xenoxyethyl)-(normal-amyl)-amine hydrochloride as a white, crystalline product melting at 119° C.

*Example 2*

102 grams (1.1 mols) of aniline, 116 grams (0.5 mol) of beta-2-xenoxy-ethyl chloride, and 14 grams (0.25 mol) of calcium oxide were heated at 182°–184° C. for 6 hours, the reaction mixture being continually agitated over this period. The crude reaction product was then cooled to room temperature, diluted with an excess of water, and extracted with benzene. The benzene extract was dried and fractionally distilled, whereby there was obtained 72 grams of (beta-2-xenoxyethyl)-(phenyl)-amine having the formula

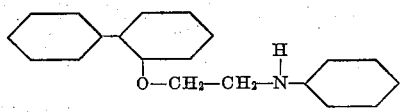

This compound was an amber-colored, viscous oil boiling at 215°—225° C. at 0.18 inch pressure, and having a specific gravity of 1.123 at 25°/25° C.

A portion of this product was dissolved in benzene and reacted with an excess of dry hydrogen chloride, whereby a white, crystalline precipitate was formed. This product was filtered out of the benzene medium and recrystallized from benzene to obtain (beta-2-xenoxy-ethyl)-(phenyl)-amine hydrochloride as a white, crystalline product melting at 140° C.

*Example 3*

In a similar manner 0.5 mol of beta-3-xenoxyethyl chloride (boiling at 179—181° C. at 5 millimeters pressure) was mixed with 1.1 mols of aniline and heated at 198°—237° C. for 19 hours. The reaction mixture was neutralized with aqueous sodium hydroxide, and the crude amine product fractionally distilled, whereby there was obtained 76 grams of (beta-3-xenoxyethyl)-(phenyl)-amine having the formula

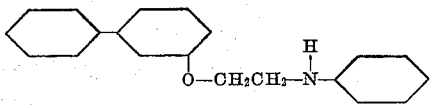

This product boiled at 168°—175° C. at 0.2 inch pressure, and was a light yellow oil which crystallized on long standing and had a characteristic amine odor.

*Example 4*

0.5 mol of beta-2-xenoxy-normal-propyl chloride (specific gravity 1.141 at 20°/4° C. and boiling point 147°—149° C. at 3 millimeters pressure) was reacted with 1.1 mols of aniline at 208°—220° C. for 30 hours, substantially as described in Example 1. As a product from this reaction there was obtained a (beta-2-xenoxy-normal-propyl)-(phenyl)-amine fraction boiling between 164° and 176° C. at 0.1 inch pressure as a viscous, yellow oil, semi-gelatinous when cooled to room temperature, and tending to decompose on distillation.

*Example 5*

116 grams (0.5 mols) of beta-2-xenoxy-ethyl chloride, and 157 grams (1.1 mols) of alpha-naphthyl amine were mixed together and heated at 200°—225° C. for 18 hours. The crude reaction product was cooled to room temperature, neutralized with an excess of aqueous sodium hydroxide, and the resulting oil layer taken up in chloroform and fractionally distilled. 76.0 grams of (beta-2-xenoxy-ethyl)-(alpha-naphthyl)-amine was thereby obtained, boiling at 260°—274° C. at 0.1 inch pressure. This compound is an amber-colored, viscous liquid at room temperature and has the formula

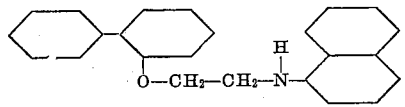

*Example 6*

116 grams (0.5 mol) of beta-2-xenoxy-ethyl chloride and 120 grams (1.1 mols) of 2-amino phenol were dissolved in 150 milliliters of xylene and the solution refluxed at 146°—157° C. for 40 hours. 220 grams of a 10 per cent aqueous sodium hydroxide solution was then shaken with the reacted mixture and the xylene layer separated. Upon distillation of the xylene solution there was obtained 71 grams of (beta-2-xenoxyethyl)-(2-hydroxy-phenyl)-amine as a thick, straw-colored sirup boiling between 210° and 224° C. at 0.2 inch pressure. This compound is soluble in alcohol and benzene and has the formula

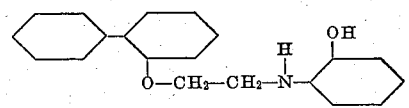

*Example 7*

116 grams (0.5 mol) of beta-2-xenoxy-ethyl chloride and 128 grams (2 mols) of mono-ethanol amine (95 per cent) were mixed together and heated at temperatures gradually increasing from 190° to 205° C. for 16.5 hours. The crude reaction product was then cooled to room temperature and neutralized with an excess of aqueous sodium hydroxide. The alkaline mixture was extracted with benzene and the benzene extract fractionally distilled, whereby there was obtained 84 grams of (beta-2-xenoxy-ethyl)-(beta-hydroxy-ethyl)-amine having the formula

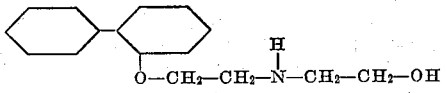

This compound is a straw-colored oil boiling at 220°—227° C. at 0.1 inch pressure and tending to crystallize out upon long standing.

*Example 8*

A mixture of 46.5 grams (0.2 mol) of beta-3-xenoxy-ethyl chloride, 42.8 grams (0.4 mol) of meta-toluidine, and 5.6 grams (0.1 mol) of calcium oxide was heated at 200°—215° C. for 6 hours with agitation. The reaction mixture was then diluted with water, extracted with benzene, and the benzene extract dried and fractionally distilled to remove the excess of unreacted toluidine. The residual brown oil was taken up with benzene and reacted with dry hydrogen chloride, whereby the secondary amine salt precipitated from solution. This precipitate was separated, washed with benzene and ether, and dried, whereby there was obtained 39 grams of (beta-3-xenoxy-ethyl)-(meta-tolyl)-amine hydrochloride as a light crystalline product melting at 167° C. Upon recrystallization from 95 per cent ethanol, this compound was obtained as a white powder melting at 168° C.

In a similar manner, other xenoxy-alkyl halides, such as the bromides and iodides, may be reacted with primary amines to form secondary amine compounds falling within the scope of this invention. Representative of the xenoxy-alkyl halides which may be so reacted are beta-2-xenoxy-ethyl bromide, a white, crystalline solid melting at 66.5° C. and boiling at 170°—175° C. at 5 millimeters pressure; beta-4-xenoxy-ethyl chloride, a crystalline compound melting at 130° C. and boiling at 163°—165° C. at 3 millimeters pressure; (beta-methyl)-(gamma-2-xenoxy)-n-propyl-chloride, an oil boiling at 170°—173° C. at 5 millimeters pressure; beta-2-(5-chloro xenoxy)-ethyl chloride, a viscous oil boiling at 149°—150° C. at 3 millimeters pressure; beta-2-(5-isopropyl-xenoxy)-ethyl chloride, an oil boiling at 150°—153° C. at 2 millimeters pressure, and having a specific gravity of 1.093 at 20° C.; etc. Other similar compounds which may be employed are omega-2-xenoxy-n-amyl-chloride, gamma-2-(5-bromo-xenoxy)- propyl bromide, beta-2-(5-tertiary-butyl-xenoxy)-ethyl chloride, beta-2-xenoxy-ethyl iodide, beta-4-(2,6-dimethyl-xenoxy)-ethyl chloride, and the like. Among the amines which may be reacted with such xenoxyalkyl halides are ethylamine, propylamine, octylamine, octadecanylamine, cyclohexylamine, benzylamine, cyclohexylethylamine, phenylethylamine, allylamine, furfurylamine, benzidine, anthramine, paratoluidine, 2-amino-diphenyl, para-chlor-aniline, and the like. The hydrochlorides of the secondary amines obtained by the reaction of the above xenoxy-alkyl halides and primary amines may be readily prepared substantially as described in the foregoing examples.

Small amounts of the secondary amines such as described in the foregoing examples may be added to aqueous acid solutions as corrosion inhibitors. For example, a 1 per cent solution of (beta-2-xenoxy-n-propyl)-(phenyl)-amine in 10.5 per cent hydrochloric acid was prepared. Weighed iron strips of 6.75 square inches surface area were suspended in this solution and also in a control solution of 10.5 per cent hydrochloric acid to determine the inhibiting effect of the amine. After 16 hours at room temperature, the test specimens suspended in the control solution were found to have lost 0.820 and 1.287 grams in weight, respectively. Similar test specimens suspended in the hydrochloric acid-amine solution showed a weight loss of only 0.030 and 0.027 grams, respectively, after 16 hours. The presence of the amine fraction in the aqueous acid solution accounted for a reduction in excess of 97 per cent of the total weight lost by corrosion. In a similar test, a 1 per cent mixture of (beta-2-xenoxy-ethyl)-(alpha-naphthyl)-amine in 10.2 per cent hydrochloric acid was compared with a control solution of 10.2 per cent acid to determine the inhibiting effect of the amine. The two metal strips suspended in the control solution lost 0.888 and 0.819 gram, respectively, while those suspended in the solution containing the secondary amine fraction showed a loss of only 0.015 and 0.040 gram. The per cent corrosion inhibition with respect to these samples was in excess of 95.4 per cent.

We claim:

1. A compound having the formula

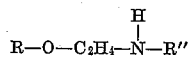

wherein R represents a xenyl radical and R'' represents a hydrocarbon radical.

2. A compound having the formula

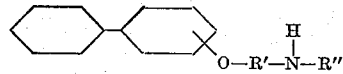

wherein R' represents a lower alkylene group and R'' represents an aryl radical.

3. A compound selected from the group consisting of (1) secondary amines having the formula

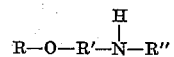

wherein R represents a xenyl radical, R' represents a lower alkylene group, and R'' represents a member of the group consisting of hydrocarbon and halo-aryl radicals, and (2) the hydrochlorides of such secondary amines.

4. A secondary amine having the formula

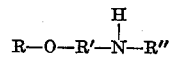

wherein R represents a xenyl radical, R' represents a lower alkylene group, and R'' represents a member of the group consisting of hydrocarbon and halo-aryl radicals.

5. A secondary amine hydrochloride having the formula

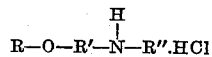

wherein R represents a xenyl radical, R' representst a lower alkylene group, and R'' represents a member of the group consisting of hydrocarbon and halo-aryl radicals.

6. A secondary amine having the formula

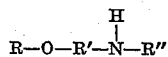

wherein R represents a xenyl radical, R' represents a lower alkylene group, and R'' represents a hydrocarbon radical.

FRANCIS N. ALQUIST.
HAROLD R. SLAGH.